United States Patent [19]

Tanaka et al.

[11] Patent Number: 4,773,273
[45] Date of Patent: Sep. 27, 1988

[54] KARMAN VORTEX FLOWMETER

[75] Inventors: Akira Tanaka; Norimitsu Kurihara, both of Saitama, Japan

[73] Assignee: Honda Giken Kogyo Kabushiki Kaisha, Tokyo, Japan

[21] Appl. No.: 39,617

[22] Filed: Apr. 17, 1987

[30] Foreign Application Priority Data

Apr. 18, 1986 [JP] Japan ................................ 61-090696

[51] Int. Cl.$^4$ .................................................. G01F 1/32
[52] U.S. Cl. ..................................... 73/861.24; 73/658
[58] Field of Search ................. 73/650, 651, 652, 654, 73/658, 861.24

[56] References Cited

U.S. PATENT DOCUMENTS

| 1,935,445 | 11/1933 | Heinz | 73/861.24 |
| 3,116,639 | 1/1964 | Bird | 73/861.24 |
| 4,470,310 | 9/1984 | Tsuruoka | 73/861.24 |

Primary Examiner—Herbert Goldstein
Attorney, Agent, or Firm—Lyon & Lyon

[57] ABSTRACT

A Karman vortex flowmeter has a column inserted in the fluid passage to produce a Karman vortex street corresponding to the velocity of a fluid and for measuring the flow rate of the fluid by making use of the variations in the pressure caused by the production of the Karman vortex street. A metal sheet member consists of a magnetic substance and includes a vibrating plate portion that is divided into two portions. Pressure transfer means in the column transmit the variations in the pressure to the vibrating plate portion for causing vibration at a rate related to the fluid flow rate. Two magnets are disposed to magnetize the two portions of the vibrating plate portion to different polarities, according to the direction of the vibration of the vibrating plate portion as caused by the variations in the pressure and a detecting means detects the inversion of the direction of the magnetic flux in the magnetic circuit formed by magnetization of the metal sheet member to find the flow rate of the fluid, the inversion being caused by the inversion of the direction of vibration of the vibrating plate portion.

14 Claims, 6 Drawing Sheets

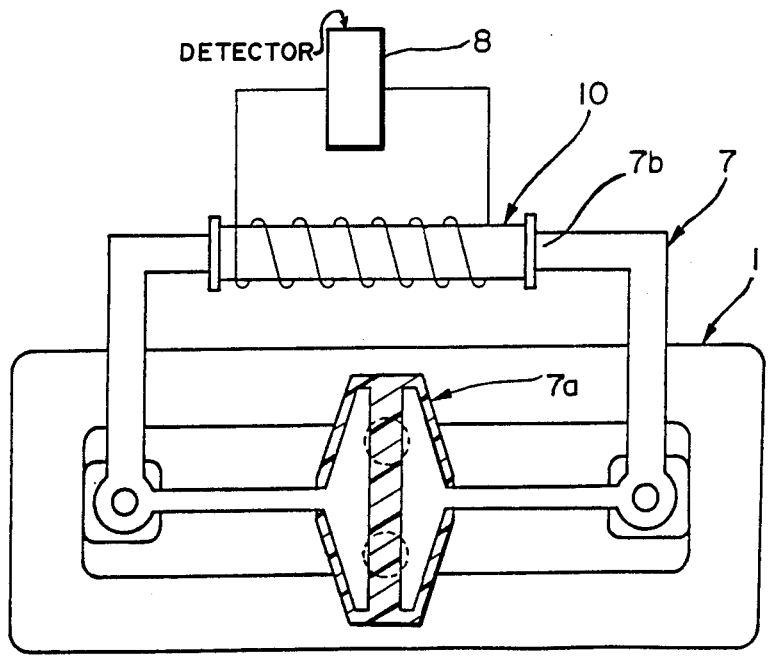
FIG. 10.
FIG. 11. FIG. 13.
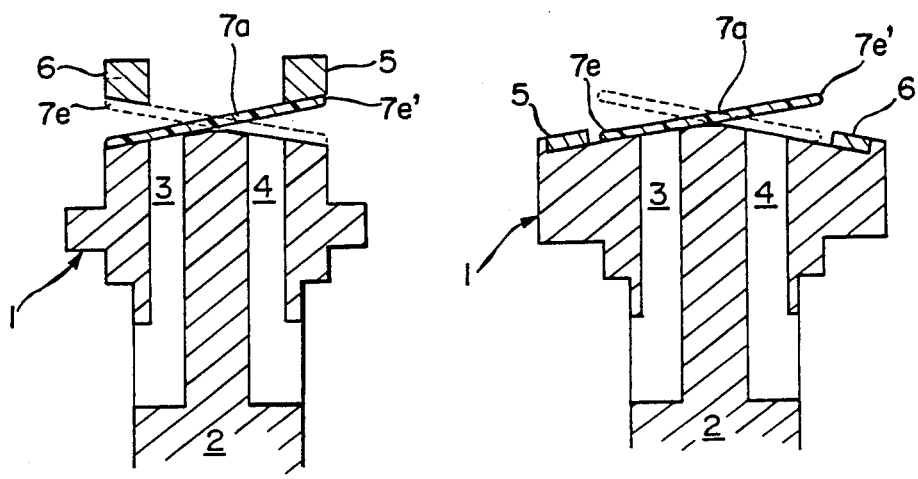

KARMAN VORTEX FLOWMETER

The present invention relates to a flowmeter for measuring the flow rate of a fluid such as air and, more particularly, to a flowmeter for measuring the flow rate of a fluid according to the manner in which a Karman vortex street is produced by a column inserted in a fluid communication passage.

A generally known instrument for measuring the flow rate of a fluid such as air is a flowmeter having a communication passage in which a column is inserted to generate vortices. A Karman vortex street is produced on the downstream side of the column at a frequency corresponding to the flow velocity. The interval at which the vortices are produced or the frequency is detected to determine the flow rate.

In the conventional flowmeter utilizing a Karman vortex street, the variations in the pressure which are caused by two rows of vortices produced alternately from opposite sides of the column are transmitted to a vibrating plate. The vibration of the plate is optically detected. That is, the interval at which the vortices are generated or the frequency is measured by sensing the reflection of the light projected onto the vibrating plate. In this optical configuration, dust or powder contained in the fluid adheres to the vibrating plate. Accordingly, the reflectivity of light varies with time and also the flowmeter is affected by external disturbing light. Thus, the ability of the flowmeter to detect flow rate deteriorates.

The present invention has been made to solve these problems. It is the object of the invention to provide a flowmeter which can detect flow rate accurately, is simple in structure, and whose ability to detect flow rate does not deteriorate in spite of the passage of time.

The above object is achieved in accordance with the teachings of the present invention by a Karman vortex flowmeter for producing a Karman vortex street corresponding to the velocity of a fluid on the downstream side of a column inserted n the fluid to produce the vortex street and for measuring the flow rate of the fluid by making use of the variations in the pressure caused by the production of the Karman vortex street, wherein a metal sheet member consisting of a magnetic substance and containing a vibrating plate portion that is divided into two portions vibrated by the variations in pressure and magnets are disposed to magnetize the two portions of the vibrating plate portion to different polarities whereby means detecting the inversion of the direction of the magnetic flux in the magnetic circuit formed by magnetization of the metal sheet member may be used to determine the flow rate of the fluid.

A flowmeter according to the invention is hereinafter described in detail by referring to the drawings, wherein:

FIG. 10 is a view showing a further embodiment in which voltage pulses are detected by a detector coil;

FIG. 11 is a cross-sectional view of another embodiment in which the magnets are positioned above the vibrating plate;

FIG. 13 is a cross-sectional view taken along the line XII—XII of FIG. 12.

Figure 1:
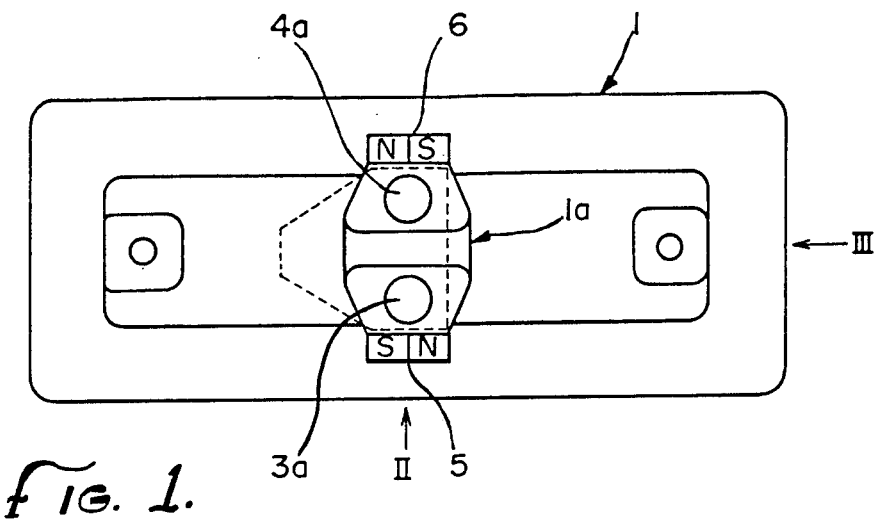
FIG. 1 is a plan view showing the shape of the structural body of a Karman vortex flowmeter according to the invention.
Figure 2:
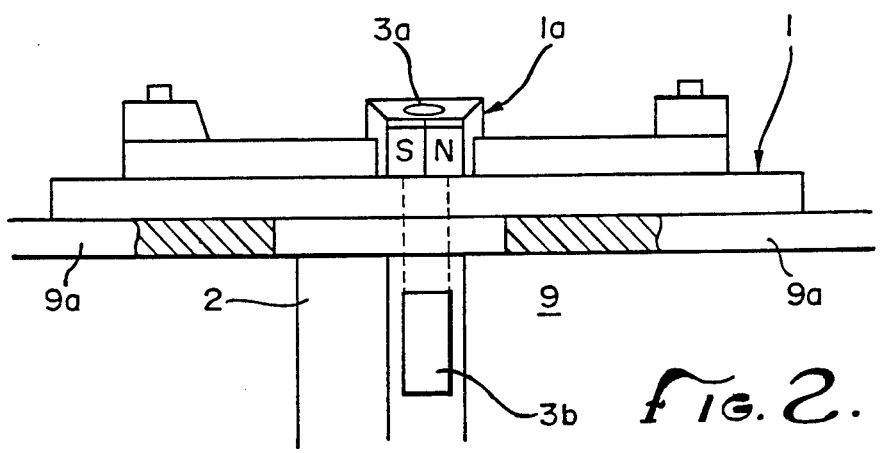
FIG. 2 is a partially cutaway elevation view taken in the direction indicated by the arrow II in FIG. 1.
Figure 3:
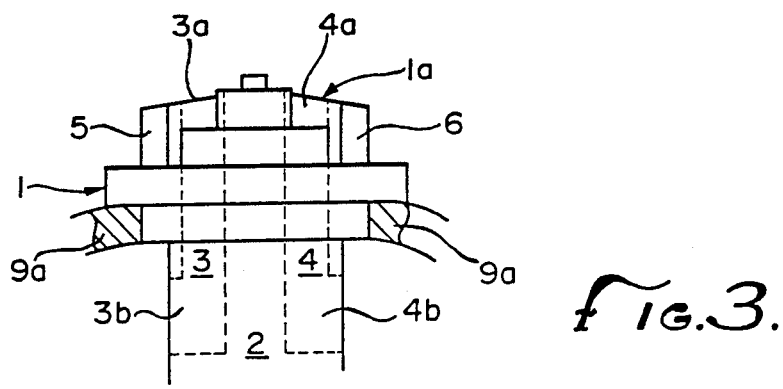
FIG. 3 is a partially cutaway elevation view taken in the direction indicated by the arrow III in FIG. 1.

FIGS. 1–4 show the structure of a Karman vortex flowmeter according to the invention. The flowmeter has a structural body 1 (hereinafter referred to as "the base") which is mounted to the wall surface 9a of a communication passage 9. A column 2 is inserted in the fluid flow within the passage 9 in a vertical relationship to the direction of the flow, and is firmly fixed to the base 1. Holes 3 and 4 extend through the base 1 and the column 2, and act as pressure-transmitting means which place the inside of the passage 9 in communication with the outside. The holes 3 and 4 have open ends 3a and 4a, respectively, on the outside of the communication passage. These open ends 3a and 4a are located on the surface of a protruding portion 1a formed at the center of the base 1. The holes 3 and 4 have inner open ends 3b and 4b, respectively, which are located on opposite side surfaces of the column 2. Two magnets 5 and 6 are embedded in the outer portions of the protruding portion 1a adjacent the open ends 3a and 4a such that their polarities are opposite to each other. The magnets are made, for example, of ferrite.

Figure 4:
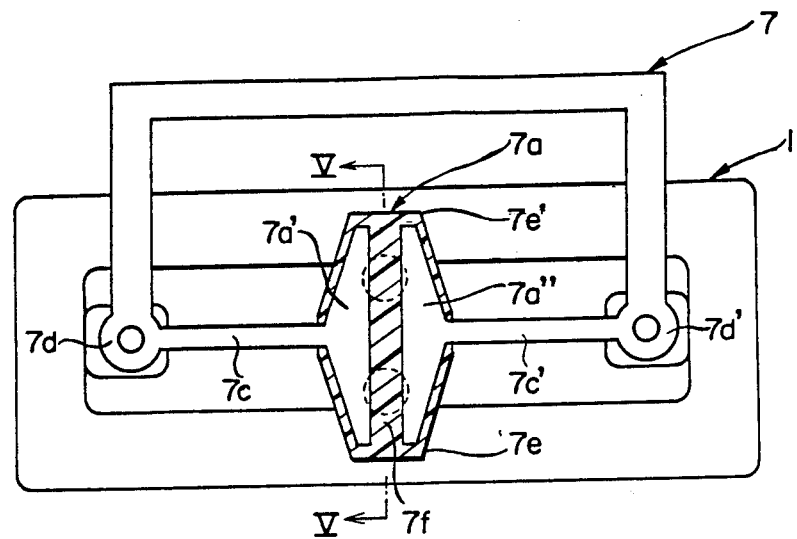
FIG. 4 is a plan view partially in cross section of a metal sheet member mounted to the structural body shown in FIG. 1.

FIG. 4 is a plan view partially in cross section of a metal sheet member 7 mounted to the base 1, the member consisting of a magnetic substance. The sheet member 7 consists of an amorphous metal sheet which serves as a member forming a magnetic circuit and also as a vibrating plate. More specifically, the sheet member 7 is cut into a substantially rectangular, annular form out of a single thin strip on an amorphous metal by photoetching or other similar process. The sheet member has a vibrating plate portion 7a (hereinafter referred to as "the vibrating plate"). The central portion of the vibrating plate 7a is divided into two portions 7a' and 7a" by a separating layer 7f of a non-magnetic material, such as resin. The surface of the vibrating plate 7a also is coated with a nonmagnetic material such as resin. Magnets 5 and 6 are mounted on the base 1 with their magnet poles oriented oppositely and extend from beneath portion 7a' to 7a" to complete two magnet circuits with opposite polarities. The left side portion 7c and the right side portion 7c' which support the vibrating plate 7a are made narrow to develop a twisting effect as described later.

Figure 5:
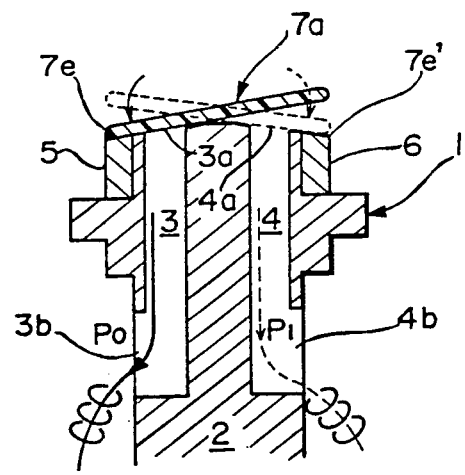
FIG. 5 is a cross-sectional view taken along the line V—V in FIG. 4, for illustrating the relationship of the variations in the pressure to the direction of vibration of the vibrating plate.

The metal sheet member 7 of the shape described above has mounting portions 7d and 7d' which are rigidly fixed to the base 1 to apply a certain tension to the vibrating plate 7a. As shown in FIG. 5, when the vibrating plate 7a vibrates, the end portions 7e and 7e' alternately incline to close the open ends 3a and 4a, respectively, of the holes 3 and 4. The metal sheet member 7 is magnetized to an intensity corresponding to the inclination of the vibrating plate 7a, i.e., the distance between the end 7e or 7e' of the vibrating plate 7a and the magnet 5 or 6.

The operation of the instrument constructed as described above will now be described by referring to FIGS. 5 and 6. When the fluid within the communication passage 9 is at rest, the vibrating plate 7a is at rest in such a way that the plate 7a is parallel with the base 1 or either the end 7e or 7e' is in contact with the corresponding magnet 5 or 6. In this state, the metal sheet member 7 is magnetized constantly. When the fluid flows through passage 9, Karman vortices are produced alternately from opposite sides on the downstream side of the column 2 according to the velocity of the flow. As a result, the pressures on opposite sides of the column 2 vary. The variations in the pressures are transmitted via the holes 3 and 4 to the vibrating plate 7a, which then begins to vibrate according to the flow velocity, or the generation of the Karman vortex street. When Karman vortices are produced, for example, to the left of the column 2, as shown in FIG. 5, the pressure P0 inside the hole 3 communicating with the left side of the passage 9 and the pressure P1 inside the hole 3 communicating with the right side have the relation P0<P1. The difference between the pressure P1 and the pressure P0 tilts the vibrating plate 7a in the direction indicated by the solid line arrow in FIG. 5. As a result, one end 7e of the plate 7a comes into contact with or close to the magnet 5, as indicated by the solid line in the FIGURE. At this time, a magnetic field is set up in the metal sheet member 7 as indicated by the solid line arrows in FIG. 6. Next, the Karman vortices are generated to the right of the column 2. Then, the relation of the pressure P0 inside the left hole 3 to the pressure P1 inside the right hole 4 is given by P0>P1. This causes the vibrating plate 7a to incline in the direction indicated by the broken line arrow in FIG. 5. The other end 7e' of the vibrating plate 7a comes into contact with or close to the magnet 6 as indicated by the broken lines in the FIGURE. As a result, a magnetic field is produced in the direction indicated by the broken line arrows in FIG. 6, i.e., in the direction opposite to the direction indicated by the arrows of solid lines. Thereafter, the Karman vortices are produced alternately on opposite sides of the column 2. As a result, the ends 7e and 7e' of the vibrating plate 7a vibrates alternately up and down, reversing the direction of the magnetic field in the metal sheet plate 7.

Figure 6:
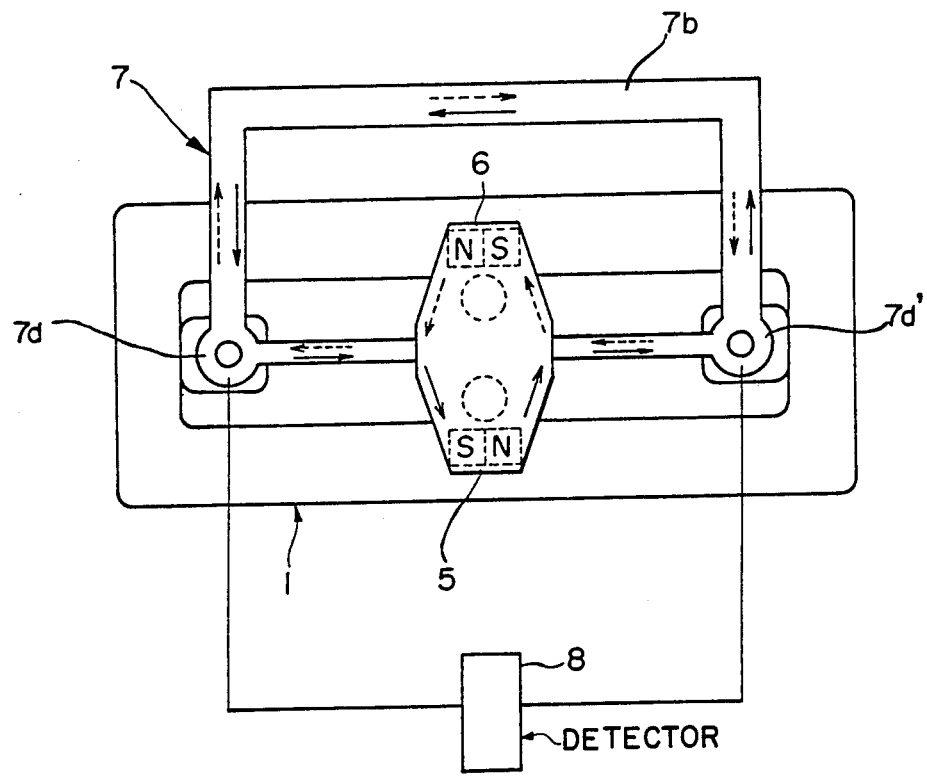
FIG. 6 is a diagram for illustrating the direction of the magnetic field in the metal sheet member.
Figure 7:
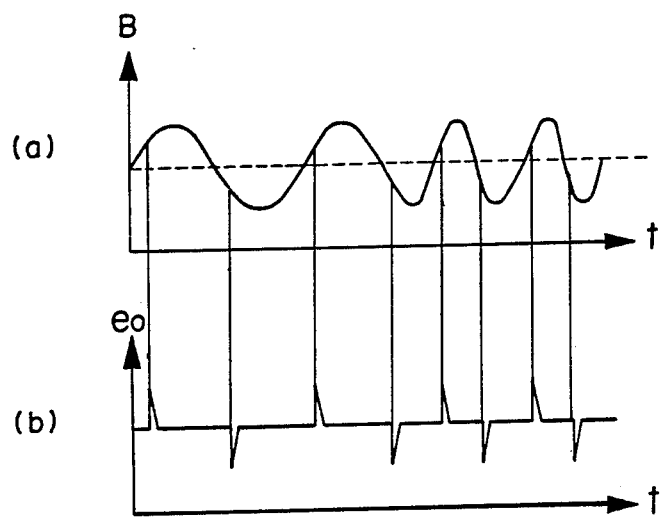
FIG. 7 is a timing chart showing variations in the intensity of the magnetic field in the metal sheet member and the generation of the voltage pulses.

The intensity of the magnetic field produced by the vertical vibration of the vibrating plate 7a increases as the distance between the end 7e or 7e' of the plate 7 and the magnet 5 or 6 is decreased. The intensity of the field is varied by the vibration of the plate 7a as shown in the graph (a) of FIG. 7. Whenever the field intensity reaches a certain strength as shown in the graph (b) of FIG. 7, a sharp voltage pulse e0 is produced between the support mounting portions 7d and 7d' of the metal sheet member 7 by the large Barkhausen effect of the amorphous metal. This pulse e0 is made sharper by the Matteuci effect that is made conspicuous by the formation of tensile layers created in the left and right support portions 7c, 7c' of the sheet member 7 by the twisting due to the inclination of the vibrating plate 7a. In this way, sharp voltage pulses are always produced without using any detector coil, irrespective of the velocity of the fluid, i.e., the velocity of the vibration of the plate 7a caused by the generation of Karman vortices. Consequently, it is easy to detect pulses and to process the resultant signals. In this embodiment, the generation of the voltage pulse e0 is detected by a detector 8 connected to the support portions 7d and 7d', as shown in FIG. 6.

Figure 8:
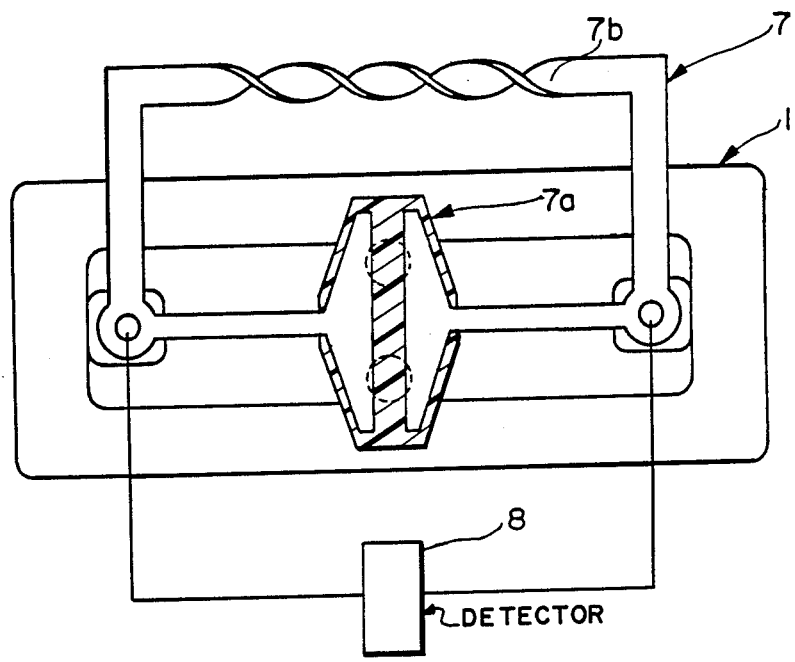
FIG. 8 is a plan view showing another embodiment of the flowmeter having a metal sheet member to which twists have been previously given.

As shown in FIG. 8, a certain number of twists, say four, are given to a portion, for example a connector portion 7b, of the magnetic circuit of the metal sheet member 7 made from an amorphous metal. This renders the Matteuci effect more conspicuous, sharpening the waveform of the pulse e0 in graph (b) of FIG. 7.

Figure 9:
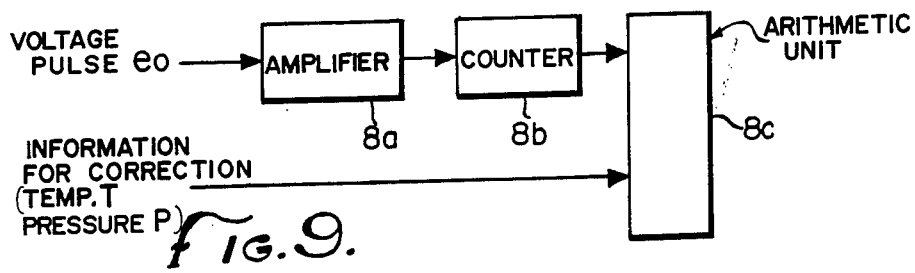
FIG. 9 is a block diagram of a voltage pulse-detecting means.

The detector 8 preferably comprises an amplifier 8a, a counter 8b, and an arithmetic unit 8c consisting of a microcomputer, as shown in FIG. 9. The detector 8 counts the number of voltage pulses e0, or the frequency f, produced during a certain period, and finds the fluid velocity v by substituting the obtained frequency f into the following formula:

$$v = d/St \times f$$

where d is the width of the column for producing vortices and St is the Strouhal number.

The arithmetic unit 8c of the detector calculates the flow rate of the fluid from the fluid velocity v found in this way and also from other types of information conventionally used for correction, for example the temperature T and the pressure P of the fluid.

In the present invention, tensile layers are formed in the left and right side portions 7c, 7c' of the metal sheet member 7 by twists caused by inclination of the vibrating plate 7a to produce and detect sharp voltage pulses, in order to simplify the detector structure of the flowmeter. Alternately, as shown in FIG. 10, a detector coil 10 may be wound around the connector portion 7b of the metal sheet member 7 to produce a large Barkhausen effect intrinsic in amorphous metal, reversing the direction of the magnetic field. The voltage pulse induced across the coil 10 may be detected.

In the above-described embodiment of the flowmeter, the magnets 5 and 6 are mounted in the base 1. The present invention is not limited to this configuration. For example, as shown in FIG. 11, magnets 5 and 6 may be disposed above the holes 3 and 4 in such a way that the vibrating plate 7a is interposed between the magnets and the holes. The magnets are positioned above both ends 7e and 7e' of the vibrating plate 7a.

Figure 12:
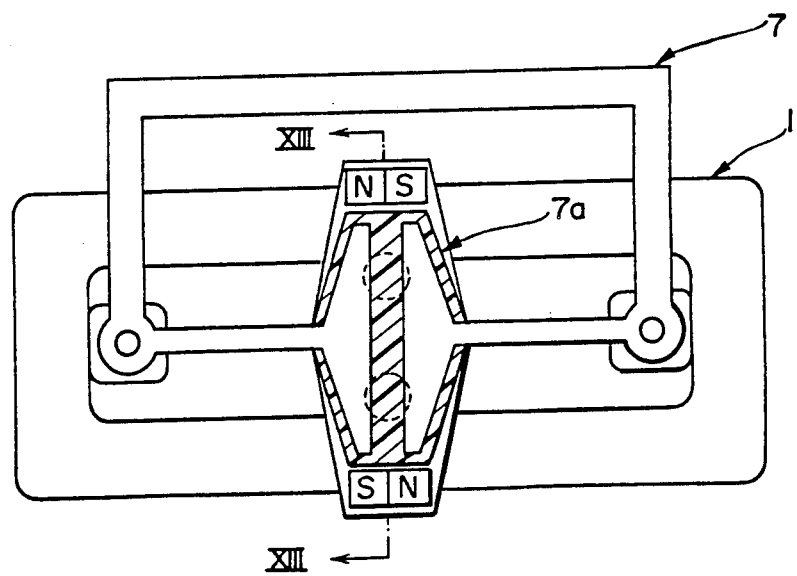
FIG. 12 is a view showing still another embodiment in which magnets are so arranged that the magnetic flux emanating from the magnets is parallel to the vibrating plate.

As shown in FIGS. 12 and 13, the magnets 5 and 6 mounted on the base 1 may be disposed outside both ends 7e, 7e' of the vibrating plate 7a so that the magnetic flux emanating from the magnets 5 and 6 may be parallel to the vibrating plate 7a, by appropriately selecting the cross-sectional area of the magnetic field surface or the thickness of the vibrating plate 7a of the metal sheet member 7.

In each of the embodiments, it is preferred that the metal sheet member 7 be made from an amorphous metal that has various features, including high toughness, high rigidity, high magnetic permeability, low coercivity, and high durability. This is because the use of an amorphous metal yields better Barkhausen effect and Matteuci effect than the case where other magnetic materials are used.

The novel flowmeter of this invention utilizes the variations in pressure caused by a Karman vortex street produced on the downstream side of a column inserted in a fluid passage wherein a metal sheet member consisting of a magnetic substance and containing a vibrating plate portion that is divided into two portions with two magnets disposed to magnetize the two portions of the vibrating plate portion to different polarities whereby a detecting means detects the inversion of the direction of the magnetic flux in the magnetic circuit formed by magnetization of the metal sheet member to determine the flow rate of the fluid. Thus, the flowmeter detects the flow rate accurately and the accuracy with which the flow rate is detected deteriorates less with time than the conventional optical detection type flowmeter, because the vibration of the vibrating plate is magnetically detected.

The Invention claimed:

1. A Karman vortex flowmeter having a column inserted in a fluid flow passage to produce a Karman vortex street corresponding to the fluid velocity for measuring the flow rate of the fluid by making use of the variations in the pressure caused by the production of the Karman vortex street, said flowmeter comprising: a metal sheet member consisting of a magnetic substance and containing a vibrating plate portion that is divided into two portions; pressure transfer means for transmitting the variations in the pressure to the vibrating plate portion for causing vibration thereof; magnets disposed to magnetize the two portions of the vibrating plate portion to different polarities, according to the direction of the vibration of the vibrating plate portion; and a detecting means for detecting the inversion of the direction of the magnetic flux in the magnetic circuit formed by magnetization of the metal sheet member to different polarities to determine the flow rate of the fluid.

2. The Karman vortex flowmeter of claim 1, wherein said vibrating plate portion is coated with a nonmagnetic material and has a separating layer at its center, and wherein the separating layer is filled with a non-magnetic material.

3. The Karman vortex flowmeter of claim 1 or 2, wherein said metal sheet member consists of an amorphous metal sheet, and wherein said detecting means has a voltage pulse-detecting means which detects voltage pulses produced from the metal sheet member due to the inversion of the direction of the magnetic flux caused by the inversion of the vibration direction of the vibrating plate portion.

4. The Karman vortex flowmeter of claim 3, wherein said metal sheet member has certain twisting portions at certain positions to improve the efficiency with which the voltage pulses produced by inversion of the direction of the magnetic flux are detected.

5. The Karman vortex flowmeter of claim 3, wherein said detecting means includes a detector coil disposed at a certain position on the metal sheet member forming a portion of said magnetic circuit so that the voltage pulses produced by inversion of the direction of the magnetic flux may be detected by said voltage pulse-detecting means.

6. The Karman vortex flowmeter of claim 1 or 2, wherein said magnets are positioned so that the magnetic flux emanating from the magnets is perpendicular to the surface of the vibrating plate portion.

7. In a Karman vortex flowmeter having a vibrating plate, the improvement comprising: the vibrating plate being of a magnetic substance that is divided into two portions; at least two magnets disposed opposite two ends of the vibrating plate portion with magnetic poles oriented oppositely to magnetize the two portions of the vibrating plate to different polarities according to the direction of the vibration of the vibrating plate; and a detecting means for detecting the inversion of the direction of the magnetic flux in a magnetic circuit formed by the magnetization of the vibrating plate to different polarities to determine the flow rate of the fluid.

8. The Karman vortex flowmeter of claim 7, wherein each said magnet has a north pole positioned adjacent one of said two portions of the vibrating plate and a south pole positioned adjacent the other of said two portions.

9. The Karman vortex flowmeter of claim 7, wherein said two portions of the vibrating plate are spaced and separated by a non-magnetic material.

10. The Karman vortex flowmeter of claim 9, wherein said two portions of the vibrating plate both form a portion of said opposite two ends.

11. The Karman vortex flowmeter of claims 7, 8, 9 or 10 wherein the vibrating plate is a portion of a metal sheet which forms the magnetic circuit.

12. The Karman vortex flowmeter of claim 11, wherein a portion of the metal sheet is twisted to enhance the operation of the detecting means.

13. The Karman vortex flowmeter of claim 11, wherein said detecting means includes a detecting coil encircling a portion of the metal sheet that includes said magnetic circuit.

14. The Karman vortex flowmeter of claims 7, 8, 9 or 10, wherein the magnets are positioned beyond and close to each said end whereby the vibrating plate does not engage said magnets.

* * * * *